(Model.)
G. F. NEWELL.
Sewing Machine.
No. 242,470.  Patented June 7, 1881.
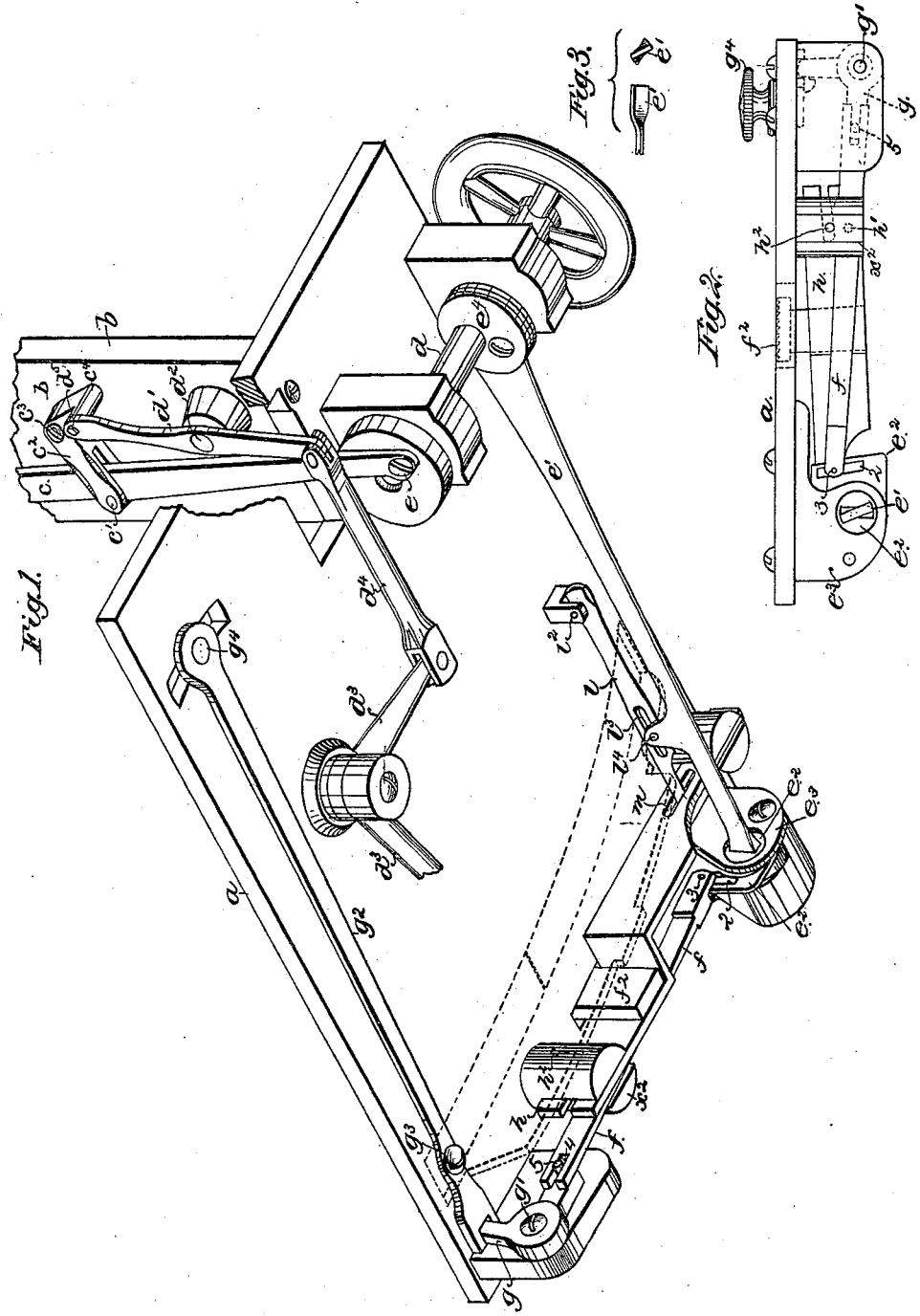
WITNESSES
Arthur Reynolds
L. F. Connor
INVENTOR
George F. Newell
by Crosby & Gregory
Attys.

UNITED STATES PATENT OFFICE.

GEORGE F. NEWELL, OF GREENFIELD, MASSACHUSETTS.

SEWING-MACHINE.

SPECIFICATION forming part of Letters Patent No. 242,470, dated June 7, 1881,

Application filed January 29, 1881. (Model.)

*To all whom it may concern:*

Be it known that I, GEORGE F. NEWELL, of Greenfield, Franklin county, State of Massachusetts, have invented an Improvement in Sewing-Machines, of which the following description, in connection with the accompanying drawings, is a specification.

This invention in sewing-machines is an improvement on machine represented in my Patents Nos. 237,442 and 237,666, February 8, 1881, to which reference may be had.

My present invention relates, chiefly, to improvements in the shuttle actuating and feeding mechanism, as will be hereinafter described.

In those patents the needle-bar is reciprocated by means of a lever placed in the horizontal part of the usual overhanging arm, it being connected at its forward end by a link with the needle-bar, and at its rear end by a second link with the upper end of an upright lever, connected at its lower end with a crank-pin of a disk, secured to a transverse shaft, located below the base of the usual overhanging arm, the said upright lever having its pivot or fulcrum in a radius bar or link pivoted within the upright part of the overhanging arm.

In this present application the needle-bar-moving mechanism will be the same as in the patents referred to, except that in this application I extend the radius-bar, which serves to hold the fulcrum of the said upright lever and form of it an elbow-lever, the rear end of which is connected with the upper end of a secondary lever, having its lower end joined by a link with the rear end of the vibrating shuttle-carrier, thus enabling me to actuate the shuttle-carrier from the upright lever of the needle-bar actuating mechanism, the shuttle and needle mechanism, thus once properly timed and connected together, always working together in unison without liability or opportunity of getting out of time.

The feeding-bar, as herein shown, is moved positively in each of its four directions. The forward end of the feed-bar is raised and lowered by means of a vibrating lever, upon which the feed-bar rests, and the feed-bar is moved forward and backward by a link and slotted feed-rocker actuated by the forward twisted end of a bar actuated by an eccentric on the main transverse shaft, before alluded to.

Figure 1 represents, in perspective, a sufficient portion of a sewing-machine, taken in connection with that shown in my Patents Nos. 237,442 and 237,666, dated February 8, 1881, to illustrate my present improvements, the overhanging arm and upright lever of the needle-bar-moving mechanism being broken off, as well as the forward end of the shuttle-carrying arm, the shuttle-race face being shown only in dotted lines, and supposed to be transparent, so as not to hide the feed-bar and its actuating mechanism beyond it. Fig. 2 is a front end view of Fig. 1, and Fig. 3 is a detail of the end of the slide-rod for moving the feed-rocker.

The cloth-support $a$, upright part $b$ of the overhanging arm, the upright lever $c$, crank $e$, and rotating shaft $d$, as well as the shuttle-race shown by the dotted lines, Fig. 1, are supposed to be as in my said patents, and need not therefore herein be further described.

The lever $c$ has its fulcrum $c'$ at the end of the elbow-lever $c^2$ pivoted at $c^3$, and that part of the said lever between the pivot $c^3$ and fulcrum $c'$ acts as in the machine described in my said patents during the operation of the needle and needle-bar.

In this present application my improvement commences with the prolongation of the part $c^2$, as at $c^4$, thus making of it an elbow-lever, instead of a simple radius bar or link, as in my other patents, and, with the short arm of this elbow-lever at $d^5$, I have connected the upper end of a secondary lever, $d'$, having its fulcrum at $d^2$, and joined at its lower end with the rear end of the vibrating shuttle-carrying lever $d^3$ by means of a link, $d^4$.

The lever $c$ of the needle-bar-actuating mechanism, common to my said patents, as the said lever is raised and lowered by the crank $e$, through the connections described, operates the shuttle-carrier in such time and with such relation to the descent and ascent of the needle-bar and eye-pointed needle carried by it as to form the usual shuttle or lock stitch, the needle-bar and shuttle-carrying lever being moved from the same crank-pin through the instrumentality of levers and links, all cams and springs being obviated.

The transverse shaft $d$ has upon it an eccentric, $e^4$, which reciprocates the bar $e'$, having its forward end (shown separately in Fig. 3)

somewhat twisted to enter and fit closely a slot in the feed-rocker $e^2$, having suitable projections to enter and be rocked on bearings formed in the stationary ear $e^3$, the reciprocations of the twisted end of the bar $e'$ in the slot of the said rocker causing the latter to oscillate or rock backward and forward for a certain distance. This feed-rocker $e^2$ is provided with an inclined or diagonal slot, 2, which receives a pin, 3, fixed in the end of the draw-bar $f$, which latter, slotted at its rear end, as at 4, receives a pin, 5, on the feed-regulating lever $g$ pivoted at $g'$.

The draw-bar $f$ is pivoted between its ends to the feed-bar $h$ at $h'$, as shown in dotted lines, Fig. 2, the said draw-bar and feed-bar being guided in a slot in a lug, $x^2$, on the plate $a$. The rear end of the feed-bar is slotted as usual, and slides on a pin or stud, $h^2$, extended through the lug $x^2$.

The lever $g$ at one end is engaged by a secondary regulating-lever, $g^2$, pivoted at $g^3$, and having at its rear end a set-screw, $g^4$, the shank of which is extended through a slot in the plate $a$. Moving the levers $g^2$ and $g$ raises or lowers the end of the draw-bar $f$ connected with the lever $g$, and causes the pin 3, at the opposite end of the draw-bar, to travel down or up in the slot 2 of the feed-rocker, and the latter, always moved the same distance at each reciprocation of the bar $e'$, will, by reason of the change of position of the pin 3 in the inclined slot 2, move the draw-bar and connected feed-bar forward a greater or less distance, according to the length of the stitch desired.

The feed-bar is raised or lowered positively by means of the raising or lowering lever $l$, pivoted at $l^2$ upon a lug connected with the plate $a$. This lever $l$ is slotted at $l^3$ to receive the pin $l^4$ on the bar $e'$ actuated by the eccentric $e^4$, the movement of the said pin in the said slot causing the forward end of the lever $l$, extended into the slot $m$ of the feed-bar, to positively raise and lower the same at the proper times to enable the usual toothed part of the said feed-bar to engage with or retire from the material being sewed.

The rough surface or toothed part $f^2$ is of usual construction.

I claim—

1. The upright lever $c$, forming part of the needle-bar-actuating mechanism, crank to operate it, and lever containing the fulcrum for the said upright lever, combined with the vibrating shuttle-carrying lever and the intermediate link and lever, substantially as described.

2. The feed-bar and connected draw-bar and feed-rocker, slotted as described, combined with the reciprocating bar $e'$, having its forward end twisted and fitted to a slot in the feed-rocker to operate the latter, substantially as described.

3. The slotted feed-rocker and reciprocating bar $e'$, twisted at its end and fitted thereto to oscillate the feed-rocker, as described, combined with the draw-bar, the feed-bar with which it is connected, and with the lever $g$, adapted to raise or lower one end of the said lever and move the pin at its other end in the slot 2 of the feed-rocker, substantially as described.

4. The reciprocating bar $e'$ and its pin combined with the slotted lever and the feed-bar with which the end of the said slotted lever is connected to raise and lower the feed-bar, substantially as described.

5. The feed-bar and the reciprocating twisted bar $e'$, and slotted lever $l$, moved by it to raise and lower the feed-bar positively, combined with the slotted feed-rocker, into which the twisted end of the bar $e'$ is fitted, and with the draw-bar connected with the feed-bar to move the latter positively forward and backward, substantially as described.

In testimony whereof I have signed my name to this specification in the presence of two subscribing witnesses.

GEORGE F. NEWELL.

Witnesses:
 G. W. GREGORY,
 W. W. SIGSTON.